Nov. 8, 1966 L. M. BEAN 3,284,794

PARALLEL ANALOG TO DIGITAL CONVERTER

Filed Feb. 6, 1963 3 Sheets-Sheet 1

WITNESSES:

Bernard R. Gregory

Dean Schron

INVENTOR
Lawrence M. Bean
BY Ernest P. Klipfel
ATTORNEY

Nov. 8, 1966 L. M. BEAN 3,284,794

PARALLEL ANALOG TO DIGITAL CONVERTER

Filed Feb. 6, 1963 3 Sheets-Sheet 2

Nov. 8, 1966 L. M. BEAN 3,284,794

PARALLEL ANALOG TO DIGITAL CONVERTER

Filed Feb. 6, 1963 3 Sheets-Sheet 3

United States Patent Office 3,284,794

Patented Nov. 8, 1966

3,284,794

PARALLEL ANALOG TO DIGITAL CONVERTER

Lawrence M. Bean, Waterloo, Md., assignor to Westinghouse Electric Corporation, Pittsburgh, Pa., a corporation of Pennsylvania Filed Feb. 6, 1963, Ser. No. 256,586
8 Claims. (Cl. 340—347)

This invention in general relates to analog to digital converters, and in particular to a high speed parallel analog to digital converter.

In general, digital information is represented in some form of numbers whereas analog information is represented in other forms such as constant, or varying voltage values. Digital computers operate on digital information which in many instances takes the form of binary word information. Various types of input information to the computer may be in the form of a voltage waveform produced by a device external to the computer. An analog to digital converter therefore, is a device which accepts this voltage waveform and transforms it into some type of digital format.

In one type of analog to digital converter of the prior art, the ramp generator is utilized to provide a linearly increasing voltage which is compared with an input analog voltage. A counter is initially set to zero and will start counting at the same time that the ramp generator initiates its linearly increasing voltage. The output from the ramp generator is compared with the input analog voltage in a null detector and when the two voltages are equal the null detector will stop the counter. The word in the counter is then the digital equivalent of the analog input. In this method the time required to obtain a digital representation of the analog input voltage will greatly vary and will be dependent upon the magnitude of the analog voltage. In addition, if a varying input analog voltage is utilized, there will be a delay in the output representation thereof depending upon the speed of the counter, and the number of bits required in the output digital signal.

A second type of converter utilizes a feedback loop with successive approximations to arrive at a correct binary output. In this type of converter, a binary counter is reset except for the most significant bit. The output of the binary counter is fed to a digital to analog converter, the output of which is compared with an input analog voltage in a voltage comparator. If the input voltage is greater than the voltage from the digital to analog converter, then the most significant bit is left a unit; otherwise it is returned to zero. The next most significant bit is then made a unit and the analog representation of this number is generated in the digital to analog converter and compared with the input voltage. If the input analog voltage is higher, then the next most significant bit is left a unit; otherwise it is returned to zero. The process continues until all the bits have been determined. In this type of converter readings are not continuous, that is, a reading is not available until all the bits have been converted to an analog voltage and then compared with the input analog voltage. In addition, as the number of binary digits to be represented is increase, the access time is increased, that is, the time between the application of the analog input signal and the reading of the digital count.

It is, therefore, an object of the present invention to provide an analog to digital converter which will give a continuous representation of an input analog voltage.

It is an additional object to provide an analog to digital converter in which the access time is greatly reduced.

It is another object to provide an analog to digital converter employing threshold detectors.

It is still another object to provide an analog to digital converter which may be used as a peak voltage detector.

A still additional object is to provide an analog to digital converter which can be adapted to provide a digital decimal output in addition to a binary output.

Another object is to provide an analog to digital converter which may provide a digital output which is a function of the analog input.

In accordance with the objects, there is provided circuit means for obtaining a plurality of control voltages proportional to an input analog voltage. A plurality of threshold detectors are provided to receive these latter control voltages and any control voltages above the chosen triggering threshold level of the threshold detector will cause it to provide a predetermined output signal. Any output signals from the threshold detectors may be fed into decoding means to obtain a binary representation thereof. In one embodiment the threshold detectors employed comprises semiconductor switching devices such as tunnel diodes which are operable in two stable states of operation.

The above stated and further objects and advantages of the present invention will become apparent upon a reading of the following specification taken in conjunction with the drawings in which.

Figure 1:
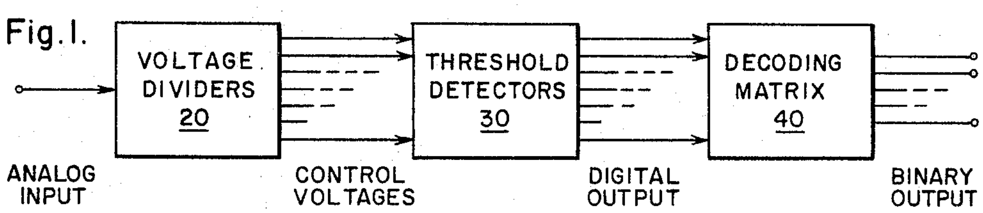
FIGURE 1 is a block diagram illustrating one embodiment of the present invention.

For an understanding of the invention, reference should now be made to FIG. 1. In FIG. 1 there is provided circuit means for obtaining a plurality of control voltages, each being a predetermined portion of an input analog signal. This circuit means may take the form of a plurality of voltage dividers 20 to provide a plurality of successively decreasing control voltages as will hereinafter be explained. A plurality of threshold detectors 30 is provided with each threshold detector receiving a different one of the control voltages from the voltage divider network 20. Each threshold detector will provide a predetermined output signal if its associated control voltage is above the threshold triggering level of the threshold detector. The digital output presented by the threshold detectors 30 may then be utilized for control purposes, or may be converted to a different type digital code such as a standard binary word format, by means of a decoding matrix 40.

Figures 2, 3, 4:
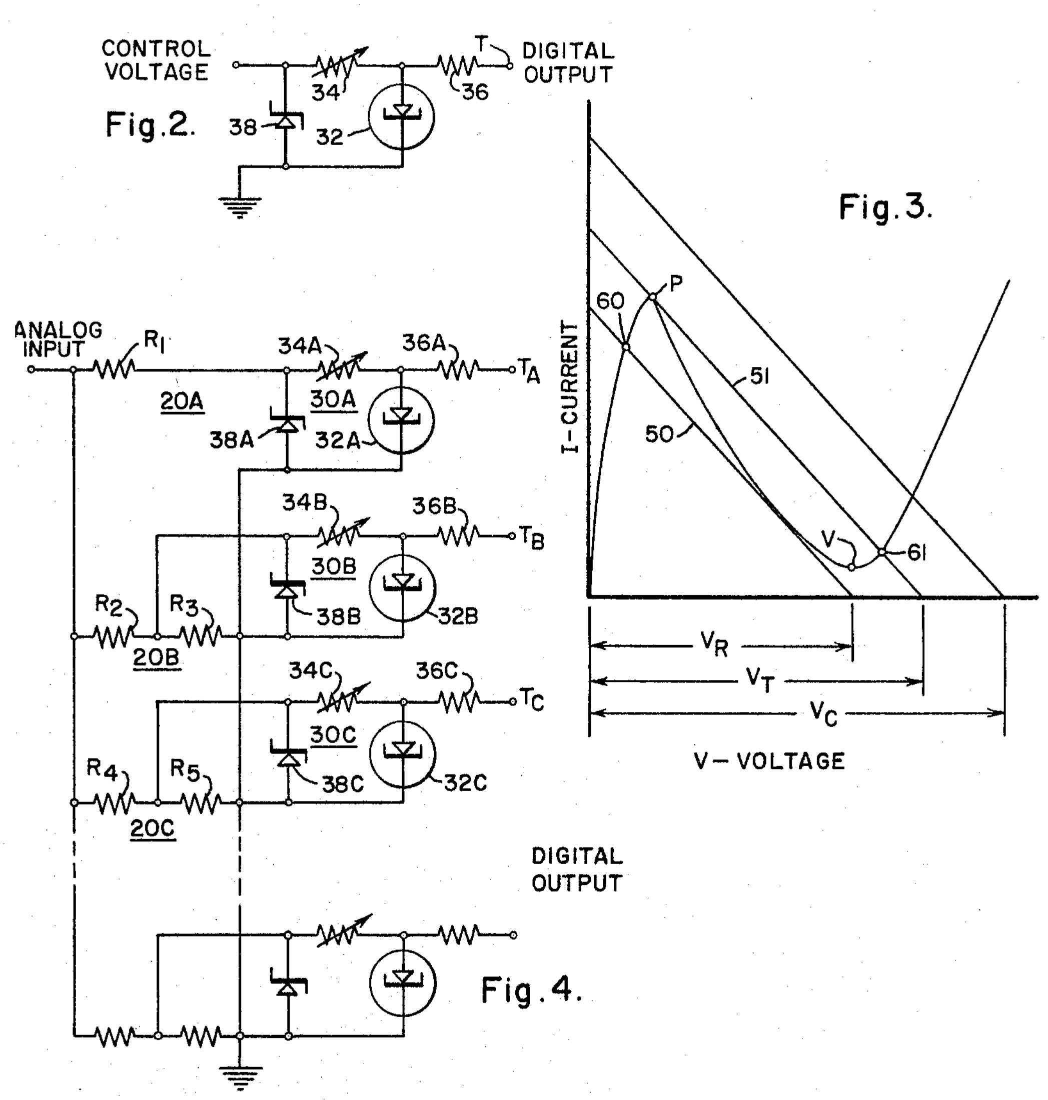
FIG. 2 illustrates one form of threshold detector which may be used in the present invention.
FIG. 3 is a voltage-current characteristic curve of a tunnel diode.
FIG. 4 is a detailed electrical circuit of one embodiment of the present invention.

FIG. 2 shows in more detail one form of threshold detector which may be used in the present invention. The threshold detector illustrated includes a high speed switching device operable in two stable states of operation and which may take the form of a tunnel diode 32. A control voltage is applied to the tunnel diode 32 via an adjustable load resistor 34. To sense the changing of states of the tunnel diode 32, there is provided an output circuit including output resistor 36 connected to the anode of the tunnel diode 32. Tunnel diodes generally have a maximum safe input voltage level which, if exceeded, would probably destroy the tunnel diode. In order to protect the tunnel diode 32, should the control voltage exceed the maximum safe input voltage level, there is provided Zener diode means having a breakdown voltage substantially equal to the maximum safe input voltage level of the tunnel diode 32 and will form a bypass circuit for the tunnel diode 32 and will keep the excessive control voltage at a safe level.

To more clearly understand the operation of the tunnel diode switching device utilized in the threshold detector of FIG. 2, reference is now made to FIG. 3 which shows a typical voltage-current characteristic curve of a tunnel diode. It may be seen that the voltage-current characteristic curve rises in a positive resistance region to a peak point P, after which it enters into a negative resistance region between the peak point P and the valley point V, and after which again enters a second region of positive resistance. The first region of positive resistance may be utilized as a first stable state, that is, a low voltage stable state of operation, and the second region of positive resistance may be utilized as a second stable state, that is, a high voltage stable state of operation. With a voltage having a magnitude of $V_R$, as shown, a typical load line 50 will intersect the voltage-current characteristic curve in the first region of positive resistance at point 60, and being in the low voltage state of operation may be considered as a digital ZERO output. As the voltage applied to the tunnel diode is increased, the load line will move parallel to itself until such time as point P is reached after which the load line will assume a new position 51 intersecting the voltage-current characteristic curve at point 61 in the second region of positive resistance which may be utilized as a digital ONE output. The voltage at which the load line reaches the peak point and operation is switched to the high voltage range is the threshold voltage shown as the magnitude $V_T$. With an applied voltage of $V_T$, or any voltage greater than $V_T$ such as $V_C$, the load line will intersect the voltage-current characteristic curve in the second region of positive resistance and will provide a digital ONE output. For any voltage of $V_R$ or less the load line will intersect the voltage current characteristic curve in the first region of positive resistance and will provide a digital ZERO output.

Referring now to FIG. 4, there is shown in more detail the voltage dividers 20 and the threshold detectors 30 of FIG. 1. The input analog voltage is fed to a plurality of voltage dividers 20A, 20B, 20C, etc., and it may be seen that the first voltage divider 20A comprising resistor $R_1$ applies the full input analog voltage to a first threshold detector 30A. 20A may be considered as a voltage divider having a first resistor $R_1$ and whose second resistor has an infinite resistance. A second voltage divider 20B including resistances $R_2$ and $R_3$ functions to supply a control voltage to threshold detector 30B, which control voltage is a predetermined portion of the input analog voltage. A third voltage divider 20C comprising resistors $R_4$ and $R_5$ apply a control voltage to the threshold detector 30C, and which control voltage is a predetermined portion of the input analog voltage and is less than the control voltage provided by the voltage divider 20B. This general scheme is continued and the number of voltage dividers and threshold detectors provided is dependent upon the number of bits that is required in the output binary word. Each of the elements in the threshold detectors 30A, 30B, 30C, etc., are numbered in accordance with the basic threshold detector shown previously in FIG. 2. The load resistances 34A, 34B, 34C, etc., acting in conjunction with the equivalent resistance of its associated voltage divider network determines the particular load line for the tunnel diodes and by varying the slope of the load line by means of the adjustable load resistors 34A, 34B, 34C, etc., the threshold triggering voltage may be varied.

Figure 5:
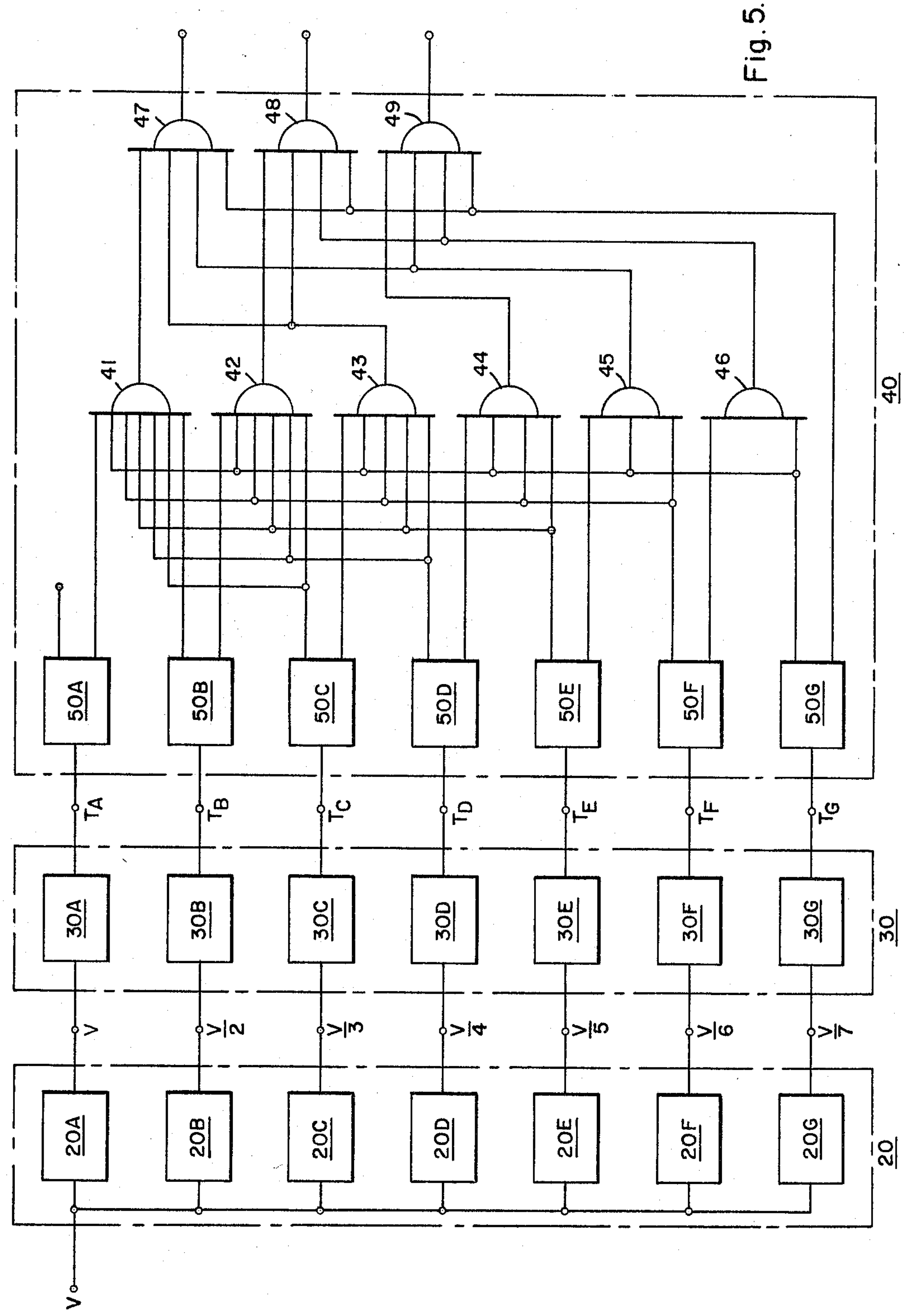
FIG. 5 illustrates the basic invention with means for obtaining a digital or a binary representation of an input analog voltage.

The entire system of FIG. 1 is shown in somewhat more detail in FIG. 5 which includes one example of a decoding matrix which may be utilized to obtain a binary word output from an analog voltage input. Suppose, by way of example, that an *n* bit binary word is desired from an input analog voltage. For a three bit word there are $2^n-1$ voltage divider networks provided, where *n* is the desired number of bits, and are shown as 20A through 20G with the voltage divider network 20A applying the full analog input voltage V to the threshold device 30A, voltage divider network 20B providing ½ the magnitude of the input voltage V to the threshold detector 30B, the voltage divider 20C providing ⅓ times the magnitude of the input voltage V to the threshold detector 30C, and so on until the last threshold detector receives a voltage $1/(2^n-1)$ times the input voltage V, that is, threshold detector 30G in this instance receives a control voltage ⅐ times the magnitude of the input analog voltage, since *n* in the example given is equal to three. Each of the voltage detectors 30A to 30G is chosen to have a threshold triggering voltage of $1/2^n$ times the full scale voltage that the analog to digital converter is capable of handling. Any output signals appearing at terminals TA through TG therefore, represent the analog voltage in a digital form. To convert this digital format to the desired three bit binary word format the decoding matrix 40 is provided and includes a plurality of inverter amplifiers or the like, capable of providing two output signals, one being the complement of the input signal and the other output being identical to the input signal. A plurality of logic AND devices 41 to 46 is provided to receive the output signals from the inverter amplifiers 50A to 50G. Any output signals from these AND devices 41 to 46 are fed to a plurality of OR devices 47 to 49 which will then provide a binary word representation of the input analog voltage, with OR device 47 providing the $2^0$ bit, OR device 48 providing the $2^1$ bit, and OR device 49 providing the $2^2$ bit.

In the operation of the circuit of FIG. 5, assume by way of example that an input voltage having a magnitude of 7 volts is applied to the circuit. Suppose further by way of example, that 7 volts is the full scale voltage of the analog to digital converter. In this instance each threshold detector 30A through 30G will have a threshold triggering voltage of $1/2^n$ times the full scale voltage which would be ⅛ times 7, that is, each of the threshold detectors is adjusted such that any applied voltage greater than ⅞ of a volt will cause a digital ONE output voltage and any applied voltage less than ⅞ of a volt will produce a digital ZERO output signal. With the 7 volt input analog voltage applied, the first voltage divider network 20A will apply a voltage of 7 volts to the threshold detector 30A which will then provide a digital ONE output signal. Voltage divider network 20B will provide a control voltage having a value of 3.5 volts, which is enough to trigger the threshold detector 30B such that it will also provide a digital ONE output signal. In like manner each of the remaining threshold detectors will provide digital ONE output signals since each associated signal is greater than the threshold triggering level of ⅞ of a volt. Each of the inverter amplifiers 50A through 50G, upon receipt of the digital ONE input signal will provide a digital ZERO output signal on the upper output lead thereof and a digital ONE signal on the lower output lead thereof. With the circuit arrangement shown each of the AND devices 41 through 46 will receive at least a digital ZERO input signal and therefore, will provide all digital ZERO signals to the OR devices 47 through 49. In this instance, however, the inverter amplifier 50G provides a digital ONE output signal on its lower lead which is fed to each of the OR devices 47 through 49 such that they will each produce a digital ONE signal and, in familiar binary notation is equivalent to a value of 7, the value of the input analog voltage. By way of further example, assume now that the input analog voltage has a value of 1 volt. Voltage divider network 20A applies a control voltage of 1 volt to the threshold detector 30A which will then produce a digital ONE output since 1 volt is greater than the threshold triggering level of ⅞ of a volt. Voltage divider network 20B will provide a control voltage of ½ of a volt which is insufficient to trigger the threshold detector 30B which will then produce a digital ZERO output signal as will the threshold detector 30C, 30D, 30E, 30F and 30G. Inverter amplifier 50A, therefore, will produce a digital ONE output signal on its lower lead and the remaining inverter amplifiers 50B through 50G will provide digital ONE output signals on their upper output lead and digital ZERO output signals on their lower output lead. In this instance the AND device 41 will produce a digital ONE output and the remaining AND devices 42 through 46 will produce digital ZERO outputs. It may be seen, therefore, that of the OR devices 47 through 49, only 47 will produce a digital ONE output whereas 48 and 49 will produce digital ZERO outputs, the combination representing the binary equivalent of 1, the value of the input analog voltage. The general scheme followed in the previous two examples will show that a correct binary output will be produced in accordance with input voltages having whole number values. The binary outputs obtained from input analog voltages having fractional values, will of course depend upon the exact magnitude of the particular input analog voltage. For example, in the circuit of FIG. 5, an input analog voltage of 1.7 volts will show up in the output binary word as having a 1 value whereas an input voltage of 1.8 will show up as having a 2 value. If there is need for greater accuracy, the circuit may be logically extended to provide an output binary signal having more bits than that of the example given. For instance, an analog to digital converter producing a six bit binary word output would utilize 63 voltage divider networks and 63 threshold detectors.

Figure 6:
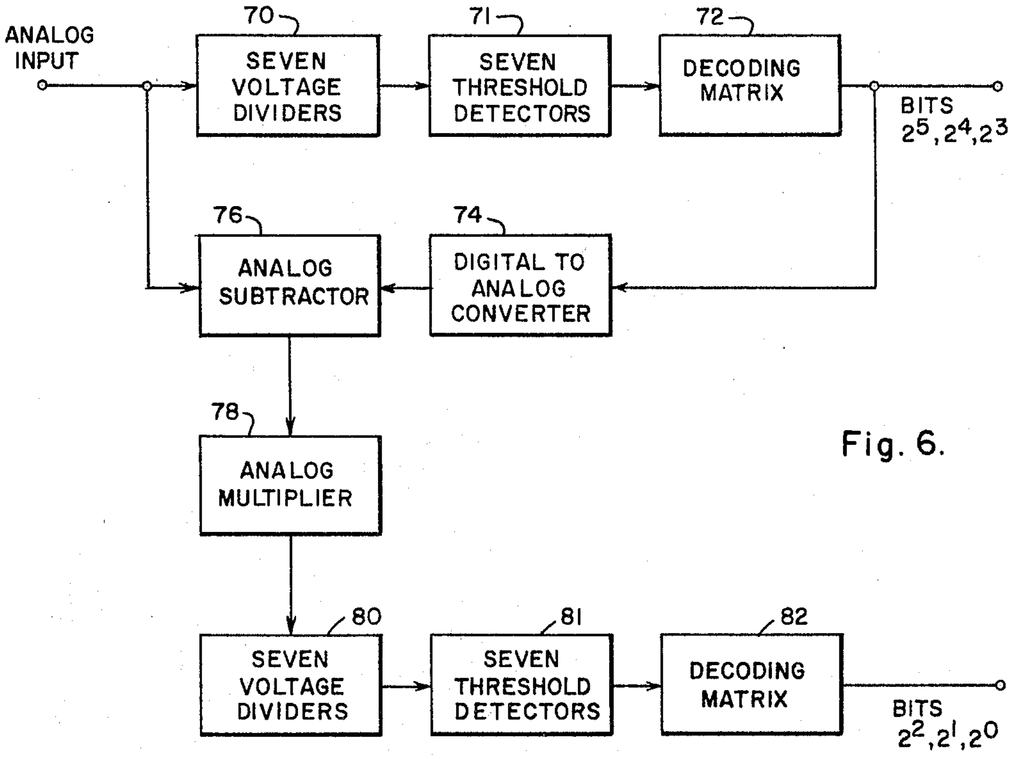
FIG. 6 is a block diagram of another embodiment of the present invention.

In order to reduce the number of components required for producing a binary word having a greater number of bits, reference should now be made to the circuit shown in FIG. 6. By way of example, the circuit shown will convert an input analog voltage to a binary word having six bits, and will utilize only 14 voltage divider networks and 14 threshold detectors instead of 63. In the circuit of FIG. 6, the input analog voltage is fed to a first stage analog to digital converter comprising voltage divider network 70, a plurality of threshold detectors 71 and a decoding matrix 72 which operation was previously explained with reference to FIG. 5, to obtain a three bit binary output. The three bits, $2^5$, $2^4$ and $2^3$, of the binary word obtained, represent the more significant digits of the binary word. The output of the decoding matrix 72 is then fed to a digital to analog converter 74 where the binary word obtained from the first stage converter is transformed back to an analog voltage and subtracted from the input analog voltage in an analog subtractor 76. The analog voltage resulting from this subtraction is then fed to a second stage analog to digital converter comprising voltage divider networks 80, a plurality of threshold detectors 81 and decoding matrix 82 to obtain the lesser significant bits $2^2$, $2^1$ and $2^0$ of the six bit binary word desired, of which the decoding matrix 72 provides bits $2^5$, $2^4$ and $2^3$ and decoding matrix 82 provides the remaining bits $2^2$, $2^1$ and $2^0$. If the threshold detectors 81 of the second stage have the same triggering threshold level as the detector 71 of the first stage, then an analog multiplier 78 may be included which multiplies the analog output from the subtractor 76 to then feed it to the second stage to trigger the second stage threshold detectors. Should the threshold detectors 81 of the second stage have a predetermined triggering threshold level smaller than those of the first stage, and dependent upon the number of stages utilized, the analog multiplier 78 would not be necessary.

In some instances an erroneous reading may be produced by the analog to digital converter upon the application of several types of varying analog input voltages. For example, and with specific reference again to FIG. 3, suppose that the control voltage being applied to the threshold detector is $V_R$. With this applied control voltage operation is in the low voltage state. As the applied control voltage increases, operation still remains in the low voltage range until such point as the triggering threshold voltage $V_T$ is reached, after which operation will quickly switch to the high voltage state as shown by the point 61 in FIG. 3; and for applied control voltages greater than $V_T$, operation will remain in the high voltage state. If the control voltage now decreases to a value just below $V_T$, operation will still be indicated as in the high voltage state, however, since the applied control voltage is less than $V_T$, the operation should be in the low voltage state. Operation will switch to this low voltage state only when the decreasing control voltage approaches the value of $V_R$ after which the switching action will occur. To eliminate this ambiguity in the limited voltage range between $V_R$ and $V_T$ shown in FIG. 3, a sampling gate may be provided which would sample the input analog voltage for brief predetermined intervals of time between which times the sampling circuit would provide a zero or ground voltage to the voltage dividers. When the sampling circuit passes a portion of the input analog voltage to the voltage divider networks, the analog to digital converter will operate as heretofore explained, and when zero or ground voltage is presented to the voltage divider networks all the threshold detector elements will be returned to their low voltage state of operation to thereby ready themselves for a next sampling, thus insuring proper operation.

Figure 7:
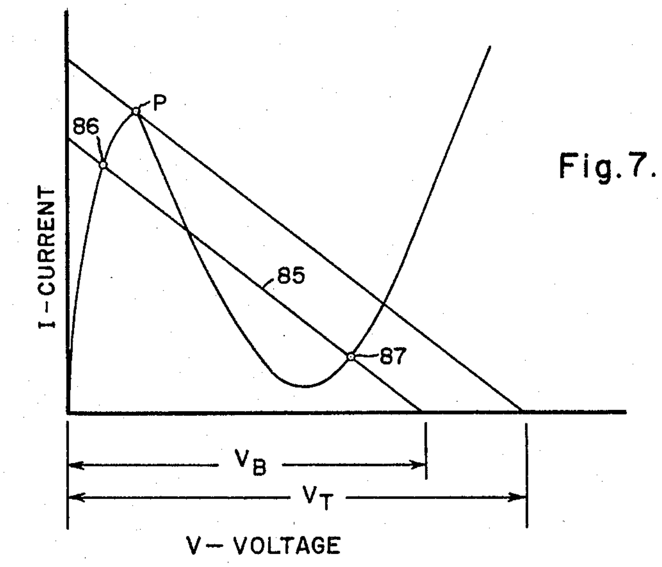
FIG. 7 is a curve illustrating a certain mode of operation of the invention.

In addition to providing a continuous digital output representation of an input analog voltage, the analog to digital converter of the present invention may also function to detect peak voltages and give a continuous output reading of these peak voltages until the threshold detectors are reset by a negative reset pulse. To this end, reference is now made to FIG. 7, which shows a voltage current characteristic curve of a tunnel diode similar to the voltage current characteristic curve of FIG. 3. The load line 85 is adjusted such that it intersects the characteristic curve at two points; one point 86 in the low voltage range and the other point 87 in the high range. The threshold detectors may be permanently biased to a point $V_B$ such that operation is at point 86 in the low voltage state of operation and will remain there until the control voltage applied reaches a value of $V_T$ after which operation will jump to the high voltage state of operation, and upon removal of the control voltage, operation will remain in the high voltage state of operation at point 87 due to the permanent bias $V_B$ on the threshold detector. In this manner, the theshold detectors will remain in their high voltage state of operation and will indicate the highest input analog voltage applied until each of the threshold detectors are reset by an external negative reset pulse to thereby bring the operation back to the low voltage state of operation.

In the previous examples given, with respect to FIGS. 5 and 6, each of the threshold detectors were assigned a threshold triggering level of $1/2^n$ times the full scale analog input voltage. By assigning the threshold detectors differing threshold triggering levels, different digital outputs may be obtained and by way of example, with the threshold detectors set to predetermined threshold levels, a digital output may be obtained which is the log, sine, cosine, etc. of the analog input thus eliminating the need for additional converting equipment.

Although the present invention has been described with a certain degree of particularity, it is to be understood that various modifications and changes may be made therein. For example, the threshold detectors need not be of the exact form shown but may comprise other types of threshold detectors such as a Zener diode wherein the triggering threshold level would be the reverse breakdown voltage of the particular Zener diode used. It is to be understood that various modifications may be made to the invention as disclosed and shown without departing from the spirit and scope of the invention, for example, although the invention herein was described with respect to an electrical system, the principles of operation are equally applicable to other type systems such as pneumatic or fluid circuits.

What is claimed is:

1. An electronic analog to digital converter for converting an analog voltage into a digital representation, comprising, in combination: a plurality of voltage divider networks each for simultaneously receiving said analog voltage to provide a plurality of successively decreasing control voltages regardless of the value of said analog voltage; a plurality of threshold detectors, each responsive to a different one of said control voltages; said threshold detectors each having substantially the same threshold level and operable to provide an output signal if its associated control voltage is above said threshold level.

2. An analog to digital converter for converting an analog signal to a binary word comprising, in combination: a plurality of signal divider networks each simultaneously responsive to said analog signal for providing a control signal proportional to said analog signal regardless of the value of said analog signal; a like pulrality of threshold detectors having substantially similar triggering threshold levels, each of said threshold detectors responsive to a different control signal for providing a digital ONE output signal if the applied control signal is above said triggering threshold level, and a digital ZERO output signal if the applied control signal is below said triggering threshold level; and decoding means connected to said threshold detectors to receive the output signals therefrom for providing a binary word representation thereof.

3. An analog to digital converter for converting an input analog voltage into an equivalent binary word form comprising, in combination: a first plurality of votlage divider networks responsive to said input analog voltage for providing a first plurality of control voltages proportional to said input analog voltage; a first plurality of threshold detectors each responsive to a different one of said control voltages for providing an output signal if its associated control voltage is above the threshold triggering level of the threshold detector; a first decoding matrix for receiving any output signals from said threshold detectors to provide a first plurality of bits of said binary word; converter means for converting said plurality of bits into an equivalent analog voltage; comparison means responsive to said input analog voltage and said equivalent analog voltage for providing a difference analog voltage; a second plurality of voltage divider networks responsive to said difference analog voltage for providing a second plurality of control voltages; a second plurality of threshold detectors each responsive to a different one of said latter control voltages for providing an output signal if its associated control voltage is above the threshold triggering level of the threshold detector; a second decoding matrix for receiving any output signals from said second plurality of threshold detectors to provide a second plurality of bits of said binary word.

4. An analog to digital converter for converting an analog voltage to an equivalent digital form comprising, in combination; a plurality of voltage divider networks for simultaneously receiving said analog voltage to provide a plurality of successively decreasing control voltages regardless of the value of said analog voltage; a plurality of semiconductor switching devices each operable in a first and second stable state of operation, each of said switching devices biased into said first stable state of operation; a first of said switching devices being responsive to said analog voltage, successive switching devices being respectively responsive to said successively decreasing control voltages, each said switching device operable to switch to its second stable state of operation if its applied control voltage is above a predetermined magnitude.

5. The converter as defined in claim 4 wherein said switching device is a tunnel diode and the first stable state of operation is a low voltage state and the second stable state of operation is a high voltage state.

6. An analog to digital converter for converting an analog voltage to an $n$ bit binary word comprising, in combination: $2^n-1$ voltage divider networks for receiving said analog voltage to provide a plurality of successively smaller control voltages regardless of the valve of said analog voltage, the first of said voltage divider networks providing a control voltage equal to the magnitude of said analog voltage and the last of said voltage divider networks simultaneously providing a control voltage $1/2^n-1$ times the magnitude of said analog voltage; $2^n-1$ threshold detectors; the first of said threshold detectors being responsive to said analog voltage, the remaining of said threshold detectors being respectively responsive to said successively smaller control voltages; said threshold detectors providing a digital ONE output signal if the voltage to which it is responsive is above a predetermined magnitude and a digital ZERO output signal if below said predetermined magnitude; and decoding means for converting said output signals to said $n$ bit binary word.

7. A converter as defined in claim 6 wherein said predetermined magnitude is $1/2^n$ times the maximum measurable analog voltage.

8. An analog to digital converter for converting an analog signal into a desired digital representation, comprising, in combination: a plurality of signal divider networks each for simultaneously receiving said analog signal to provide a plurality of successively decreasing control signals regardless of the valve of said analog signal; a plurality of threshold detectors, each responsive to a different one of said control signals; said threshold detectors each having a threshold level, and operable to provide an output signal if its associated control signal is above said threshold level, the threshold levels of said threshold detectors chosen so that the output signals from said threshold detectors is a digital representation of a predetermined function of said analog signal.

References Cited by the Examiner

UNITED STATES PATENTS

| | | | |
|---|---|---|---|
| 2,969,535 | 1/1961 | Foulkes | 340—347 |
| 2,991,461 | 7/1961 | Sturgeon | 340—347 |
| 3,041,469 | 6/1962 | Ross | 340—347 |
| 3,142,056 | 7/1964 | Martin et al. | 340—347 |

MAYNARD R. WILBUR, *Primary Examiner.*

MALCOLM A. MORRISON, *Examiner.*

K. R. STEVENS, M. A. LERNER, *Assistant Examiners.*